United States Patent
Lecher et al.

[11] Patent Number: 6,123,377
[45] Date of Patent: Sep. 26, 2000

[54] VEHICLE COVERING PART WITH LARGE FREE SURFACE

[75] Inventors: Franz Lecher, Sindelfingen; Anton Reichel, Ditzingen; Bruno Sacco, Sindelfingen; Hubert Scheper, Weil der Stadt, all of Germany

[73] Assignee: DaimlerChrysler AG, Stuttgart, Germany

[21] Appl. No.: 09/307,028

[22] Filed: May 7, 1999

[30]       Foreign Application Priority Data

May 7, 1998  [DE]    Germany ............................ 198 20 337

[51] Int. Cl.⁷ ........................................................ B60P 3/05
[52] U.S. Cl. ........................ 296/24.1; 296/208; 296/37.8; 180/315
[58] Field of Search .................... 296/24.1, 208, 296/37.8; 180/315; 454/162

[56]                References Cited

U.S. PATENT DOCUMENTS

| | | | |
|---|---|---|---|
| D. 359,266 | 6/1995 | Karp et al. ............... | D12/419 |
| D. 385,847 | 11/1997 | Ma et al. ................. | D12/415 |
| D. 389,798 | 1/1998 | Ma et al. ................. | D12/192 |
| D. 419,936 | 1/2000 | Sacco et al. ............. | D12/192 |
| 3,059,561 | 10/1962 | Wilfert ........................................... | 98/2 |
| 3,194,338 | 7/1965 | Rutman et al. . | |
| 4,022,599 | 5/1977 | Wilson et al. .............. | 62/244 |
| 4,365,826 | 12/1982 | Iriyama ..................... | 296/193 |
| 4,818,008 | 4/1989 | Cressoni ................... | 296/37.8 |
| 5,048,083 | 9/1991 | Dunchock ................. | 379/454 |
| 5,131,036 | 7/1992 | Dunchock ................. | 379/446 |
| 5,150,406 | 9/1992 | Dunchock ................. | 379/446 |
| 5,335,751 | 8/1994 | Kuroki ..................... | 180/336 |
| 5,609,382 | 3/1997 | Schmid et al. ........... | 296/37.8 |
| 5,673,964 | 10/1997 | Roan et al. ............... | 296/208 |
| 5,678,877 | 10/1997 | Nishijima et al. ....... | 296/208 |
| 5,823,599 | 10/1998 | Gray ......................... | 296/37.8 |
| 5,836,496 | 11/1998 | Levin et al. ............... | 224/553 |
| 5,979,965 | 4/1999 | Nishijima et al. ....... | 296/208 |
| 6,025,831 | 2/2000 | Gardiner .................. | 345/157 |
| 6,048,020 | 4/2000 | Gronowicz et al. ..... | 296/70 |

FOREIGN PATENT DOCUMENTS

| | | |
|---|---|---|
| 20 26 489 | 6/1971 | Germany . |
| 29 24 979 | 1/1981 | Germany . |
| 35 01 714 | 7/1986 | Germany . |
| 42 36 850 | 4/1994 | Germany . |
| 44 36 420 | 4/1996 | Germany . |

*Primary Examiner*—Joseph D. Pape
*Assistant Examiner*—Kiran Patel
*Attorney, Agent, or Firm*—Evenson, McKeown, Edwards & Lenahan, P.L.L.C.

[57]                ABSTRACT

A covering part for mounting on a front wall of an occupant compartment of a vehicle, having an instrument panel and a center console which starts in the center on a lower instrument panel area and continues in the longitudinal direction of the vehicle occupant compartment. For providing a sufficiently large free surface for a combined accommodation of a plurality of operating elements with or without control and display elements in a cohesive operating unit and of large-surface air outlet openings, the instrument panel is constructed with a hood-shaped center part which extends in a diagonally sloped manner with respect to the center console and changes into the center console at the end side. The center part is provided with a bridge console spanning the center part at a distance from its front surface, which bridge console extends from the upper instrument panel area to the center console.

15 Claims, 7 Drawing Sheets

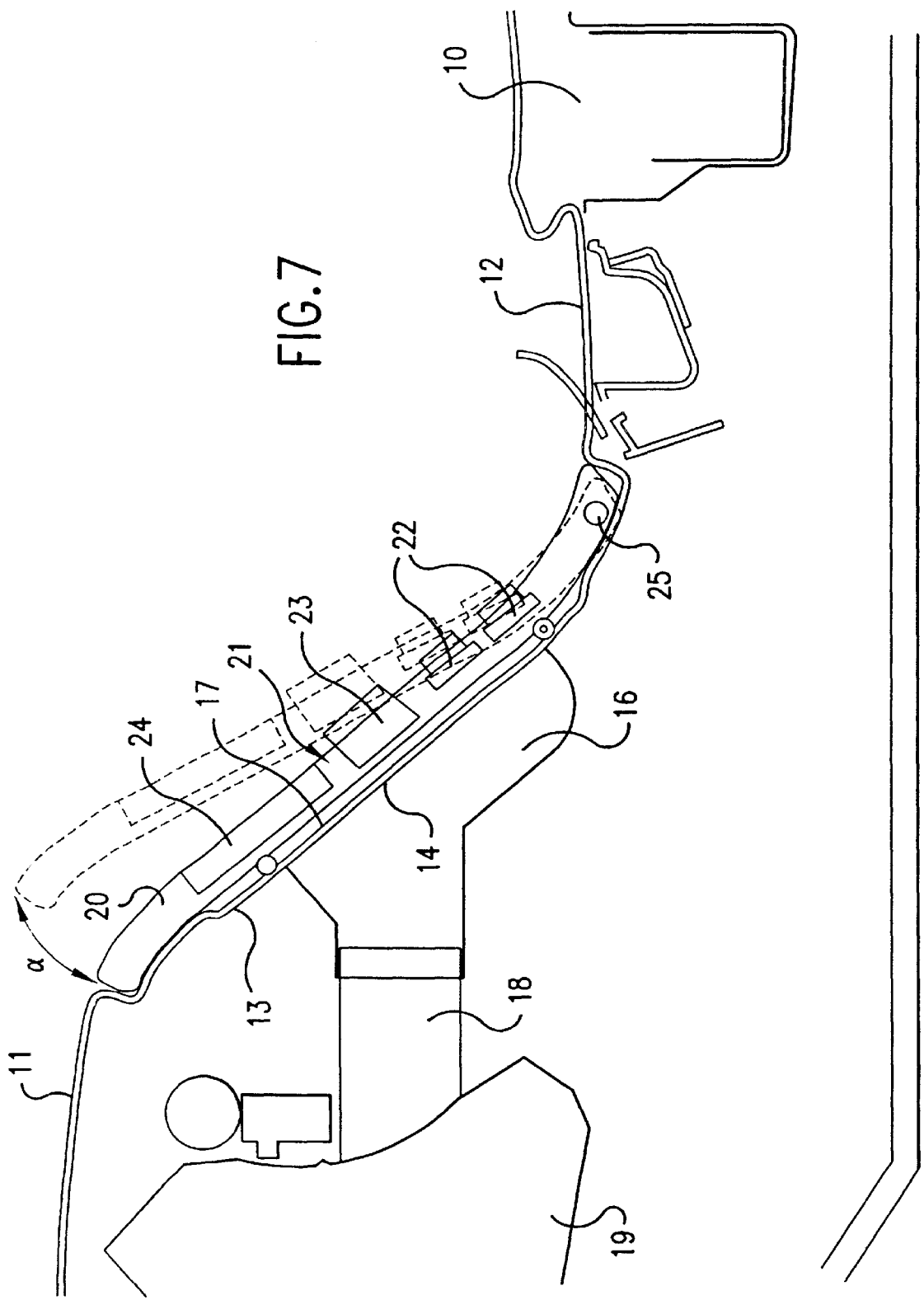

VEHICLE COVERING PART WITH LARGE FREE SURFACE

BACKGROUND OF THE INVENTION

This application claims the priority of German application 198 20 337.3, filed in Germany on May 7, 1998, the disclosure of which is expressly incorporated by reference herein.

The present invention relates to a covering part for mounting on a front wall of an occupant compartment of a vehicle, and more particularly, to a covering part comprising an instrument panel, a center console which extends centrally in a longitudinal direction of the vehicle occupant compartment, and a hood-shaped center part extending in a center on a lower instrument panel area, in a diagonally sloped manner, and changing on an end side thereof into the center console, A known covering part of the type shown in DE 44 36 420 C2 has an instrument panel as well as a hood-shaped center console which originates from the instrument panel. The covering part is fastened on a tunnel which extends through the center of the occupant compartment and has a longitudinal part, which extends between the front seats of the vehicle occupant compartment parallel to the tunnel. A diagonally ascending front, transition or center part establishes the transition to the instrument panel and contains function switches for operating electric window lift mechanisms and the like. Shifting levers or transmission selector levers of a shifting block as well as a tray are arranged in the longitudinal part of the center console, which is, for example, constructed as a shell-shaped plastic preform. The tray provides connections and holding devices for accommodating an individual box of various designs.

In another known type of covering part shown in DE 20 26 489 A1, the center console extends to the vehicle body front wall, which separates the engine compartment from the occupant compartment. The air distributor space of an air conditioner is placed onto the center console and, on its front side facing the occupant compartment, is covered by the instrument panel extending to the center console. From the air distributor space, air ducts lead to slot-type defroster nozzles arranged in the instrument panel below the windshield, to center nozzles arranged in the center and to side nozzles arranged close to the side windows, as well as through the center console to rear nozzles arranged in the rear.

In the two side walls of the air distributor space itself in the foregoing arrangement, leg space nozzles situated below the instrument panel are arranged for ventilating the driver's and front passenger's leg space, which leg space nozzles can optionally be closed by means of shut-off flaps. Because of the large number of air outlet openings as well as the required arrangement of additional equipment parts, such as the front passenger air bag, the radio, depositing compartments and the like, little free surface is available in the covering part for accommodating operating and display elements. Because of the increasing motorization of adjusting operations, such as the seat adjustment, the window lifting mechanisms, the mirror adjustment, the headrest adjustment and the like, the number of operating elements, is, however, continuously increased.

In a known driver's cab of a truck as seen in U.S. Pat. No. 3,194,338, an instrument desk is arranged directly on the steering wheel on a dashboard, which extends along the windshield. A first console constructed as a hollow housing is fastened on the drive shaft tunnel and extends in the longitudinal direction of the cab between the seats to the dashboard and contains a glove compartment in the rear area. On this straight-surface first console, which is constructed in the shape of a box, another console is fastened which tapers toward the rear. A large number of switches and control displays are housed on the side faces of the two consoles which face the driver.

DE 35 01 714 A1 shows a tray arrangement in the tunnel area of trucks having a tray, which is fixed to the tunnel and extends in the longitudinal direction of the vehicle, as well as a box-type mounting which is longitudinally displaceable with respect to the lower tray. The box-type mounting, in turn, consists of a lower storage box, which is open on the top and has lateral guiding elements sloping downward from the front toward the rear, and of an upper table element which is displaceably guided in the guiding elements so that the box-type mounting can be displaced in the horizontal direction along the lower tray and optionally the upper table element can also be lifted with respect to the storage box. This results in a simple and variable modular multi-purpose construction.

DE 42 36 850 C1 shows a console which is arranged between the driver's seat and the front passenger's seat of a utility vehicle and has trays and an element with a working and/or stepping surface displaceable above the trays. The working and/or stepping surface is fastened on a drive shaft tunnel extending between the seats. For the purpose of a further development of the console as a central operating area with an ergonomically placed depositing and/or working surface, the trays are constructed as receiving modules for operating elements, installation units and/or objects and are lined up in a flush manner to form a modular block. The depositing and/or working surface as well as a climbing aid for climbing through between the driver's seat and the front passenger's seat is implemented by a bow which can be displaced at a small distance from the modular surface along the modular block in rails fastened on the tunnel.

DE 29 24 979 A1 also shows a tray for a driver's cab of a utility vehicle which is fastened on the engine tunnel extending between the driver's seat and the front passenger's seat and provides a storage space which is enclosed by a bordering. For implementing a working surface for the driver or the front passenger, a lid part is assigned to the storage space and is connected with the bordering in a hinge-type manner and has a working surface on its underside. By folding over the lid part by 180°, the working surface is swivelled upward into a usage position.

SUMMARY OF THE INVENTION

An object of the present invention is to provide a covering part with a sufficiently large free surface for the combined accommodation of a plurality of operating elements with or without control and display elements in a cohesive operating unit.

According to the present invention, this object has been achieved by providing that a bridge console, which is sized to span the center part at a distance from a front surface thereof, extends from an upper instrument panel area to the center console, and air outlet openings are operatively arranged in the center part.

The covering part according to the present invention has the advantage that, as the result of the introduction of the bridge console spanning the front surface of the center part of the console, a large-surface area is provided on its top side for accommodating arbitrary instruments, control lights, switches and the like, without any significant limitation of the usage possibility of the front surface of the center part of the instrument panel. By accommodating air outlet openings, this center part is used for a comfortable ventilation of the driver's and the front passenger's space, in addition to the air outlet openings which normally exist in the instrument panel itself. As a result of the size of the available free surfaces on the center part, the air outlet openings and the air grids covering them can be configured with a higher freedom of design.

According to an advantageous currently contemplated embodiment of the invention, the bridge console is constructed to be separable from the instrument panel and from the center console. As a result, the bridge console with an operating unit integrated therein can be produced and tested as a fully operable complete unit. According to another embodiment of the invention, the electric connections can be combined to the operating elements and/or control and display elements in a central plug which can simultaneously be used as a diagnostic plug. The diagnostic plug can be arranged, for example, behind a depositing compartment or an ashtray in the covering part.

According to a currently preferred embodiment of the invention, the bridge console is constructed to be displaceable in the direction of its normal line with respect to the surface such that it can be placed on the front surface of the center part of the instrument panel. Alternatively, the console can also be constructed to be swivellable about a swivel pin arranged close to the center console and aligned transversely with respect to the longitudinal axis of the bridge console and the center console, whereby it can also be arrested in each swivelling position, in a form-locking or force-locking manner. Because of the displaceability or swivellability of the bridge console, the integrated operating unit can be ergonomically optimally positioned with respect to the respective driver.

According to a preferred embodiment of the invention, an air outlet opening is provided in the front surface of the center part of the instrument panel, and in the lateral parts of the center part one air outlet opening respectively is provided which can be closed off by a flap. The air outlet opening in the front surface of the center part and the backside of the bridge console in the area of this air outlet opening are coordinated with one another such that, when the bridge console is placed on the front surface of the center part, the air outlet opening is closed. Thus, the displaceability of the bridge console simultaneously opens up the possibility to use different types of ventilation of the front space of the vehicle occupant compartment.

If the bridge console is placed on the center part of the instrument panel, the ventilation takes place through the lateral air outlet openings which can optionally be closed off. If the bridge console is lifted off the center part of the instrument part, an indirect ventilation will start with the closing of the lateral air outlet openings through the gap forming between the backside of the bridge console and the front surface of the center part containing the air outlet opening. If the shut-off flaps on the lateral air outlet openings in the center part are opened up, a condition of maximal ventilation is reached.

Other objects, advantages and novel features of the present invention will become apparent from the following detailed description of the invention when considered in conjunction with the accompanying drawings.

BRIEF DESCRIPTION OF THE DRAWINGS

FIG. 7 is a view very similar to that of FIG. 5 but of a further modified covering part.

DETAILED DESCRIPTION OF THE DRAWINGS

Figure 1:
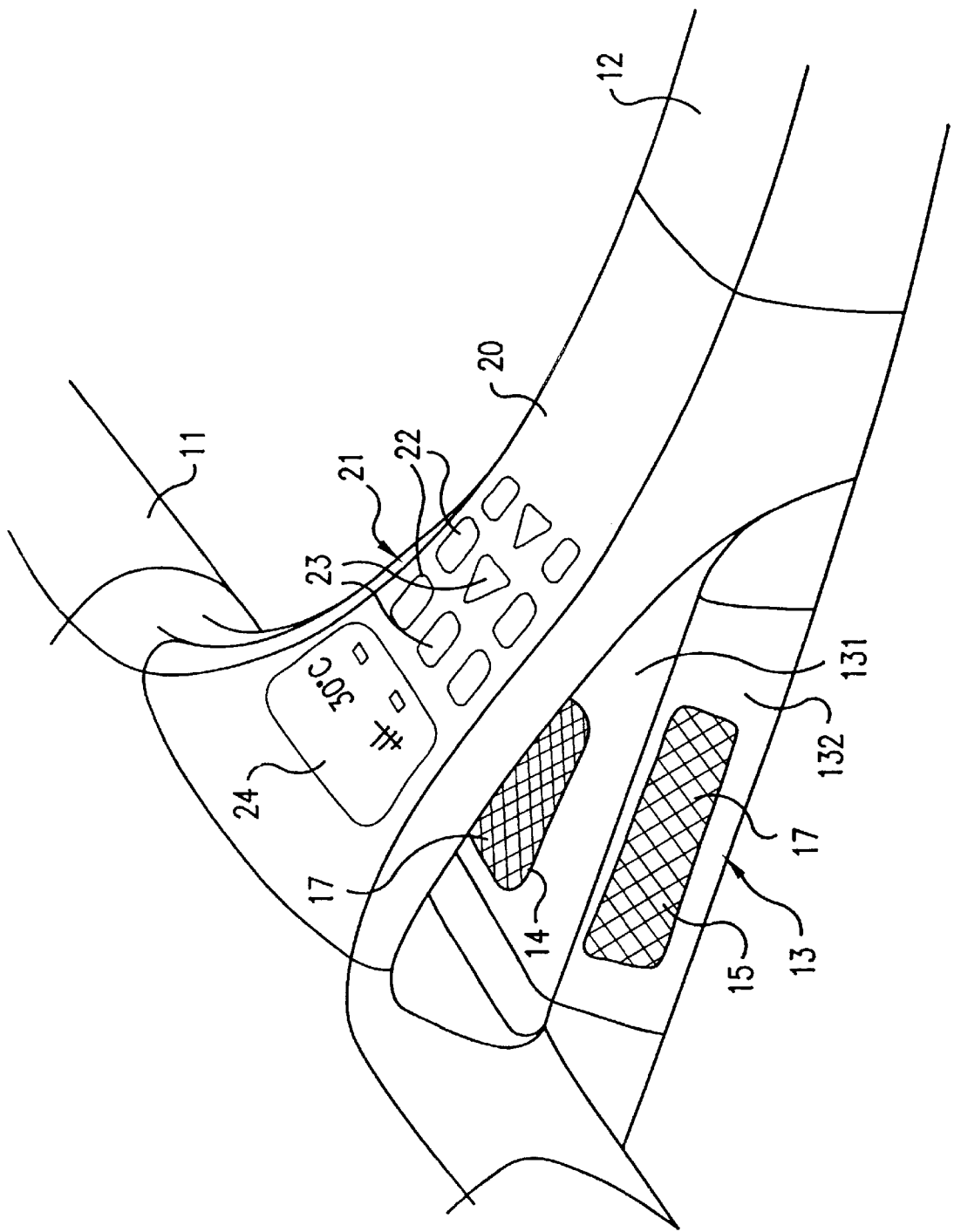
FIG. 1 is a perspective view of a covering part for mounting on a front wall of an occupant compartment of a vehicle.

The covering part, which is illustrated schematically as a perspective and as a cutout in FIG. 1, for mounting to a front wall, which in a vehicle body separates the occupant compartment from the engine compartment of the vehicle, includes an instrument panel 11 which extends to the underside of a windshield closing off the occupant compartment, as well as a center console 12 which starts in the center on the lower instrument panel area and continues in the longitudinal direction of the occupant compartment between the front seats. The instrument panel 11, also called dashboard, has a hood-shaped center part 13 which extends in a diagonally sloped manner with respect to the center console 12 and, on the end side, changes into the center console 12 and has a front surface 131 and two lateral surfaces 132 and 133 bent away therefrom.

Figure 2:
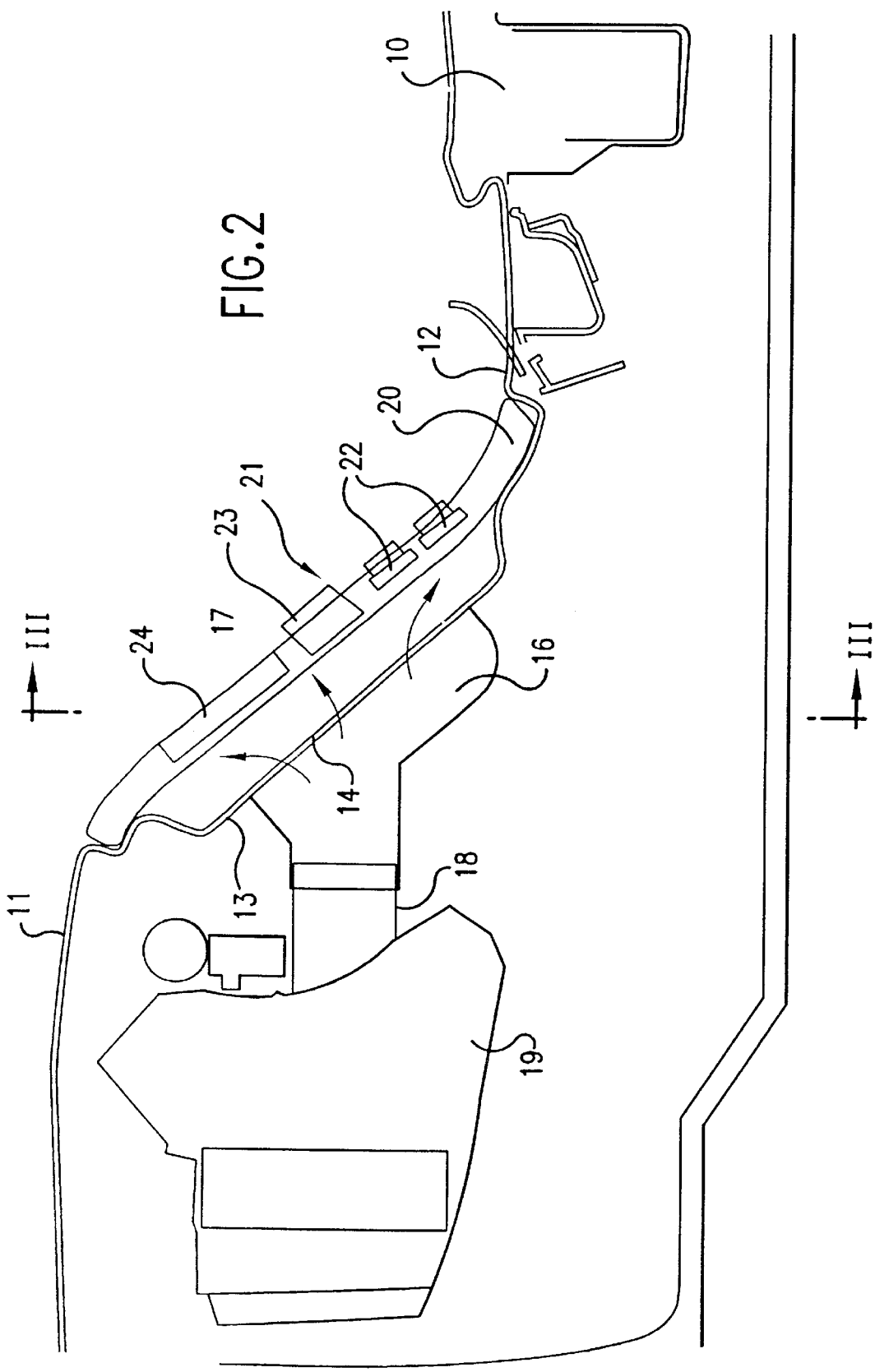
FIG. 2 is a longitudinal sectional view of the covering part in FIG. 1 along line II—II in FIG. 3.

In the front surface 131 and in each lateral surface 132, 133, one respective air outlet opening 14, 15, 16 is arranged and covered by a ventilation grid 17. The two air outlet openings 15, 16 in the lateral surfaces 132, 133 of the center part 13 can be closed by shut-off flaps in a known manner. As illustrated in FIG. 2, the air outlet openings 14, 15, 16 are connected by way of an air duct 18 covered by the covering part to the air-conditioning box 19 of an air conditioner. The center console 12 normally contains storage compartments, as indicated in FIG. 2 by reference number 10.

The covering part also includes a bridge console 20 which spans the center part 13 at a distance from its front surface 131 and extends from the upper instrument panel area to the center console 12. By way of its one end, as best seen in FIG. 2, the bridge console 20 adjoins the upper edge of the instrument panel 11 in a flush manner and, by way of its other end, as best illustrated in FIG. 1, rests against the contour of the center console 12.

The bridge console 20 is constructed to be easily separable from the instrument panel 11 and the center console 12 so that it can be mounted and demounted at any time. The top side of the bridge console 20 is slightly curved and rounded along its lateral edges and accommodates an operating unit 21 which includes a plurality of operating elements 22, control lights 23 and display elements which are combined here in a display 24.

All electric connections of the elements within the operating unit 21, such as the operating elements 22, the control lights 23 and the display 24, are combined in a central plug (not shown) and which is positioned in the covering part at a suitable, easily accessible point and can be utilized as a diagnostic plug for the bridge console 20. In order to minimize the depth of the bridge console 20, the operating elements constructed as switches are implemented in a foil technique.

Figure 3:
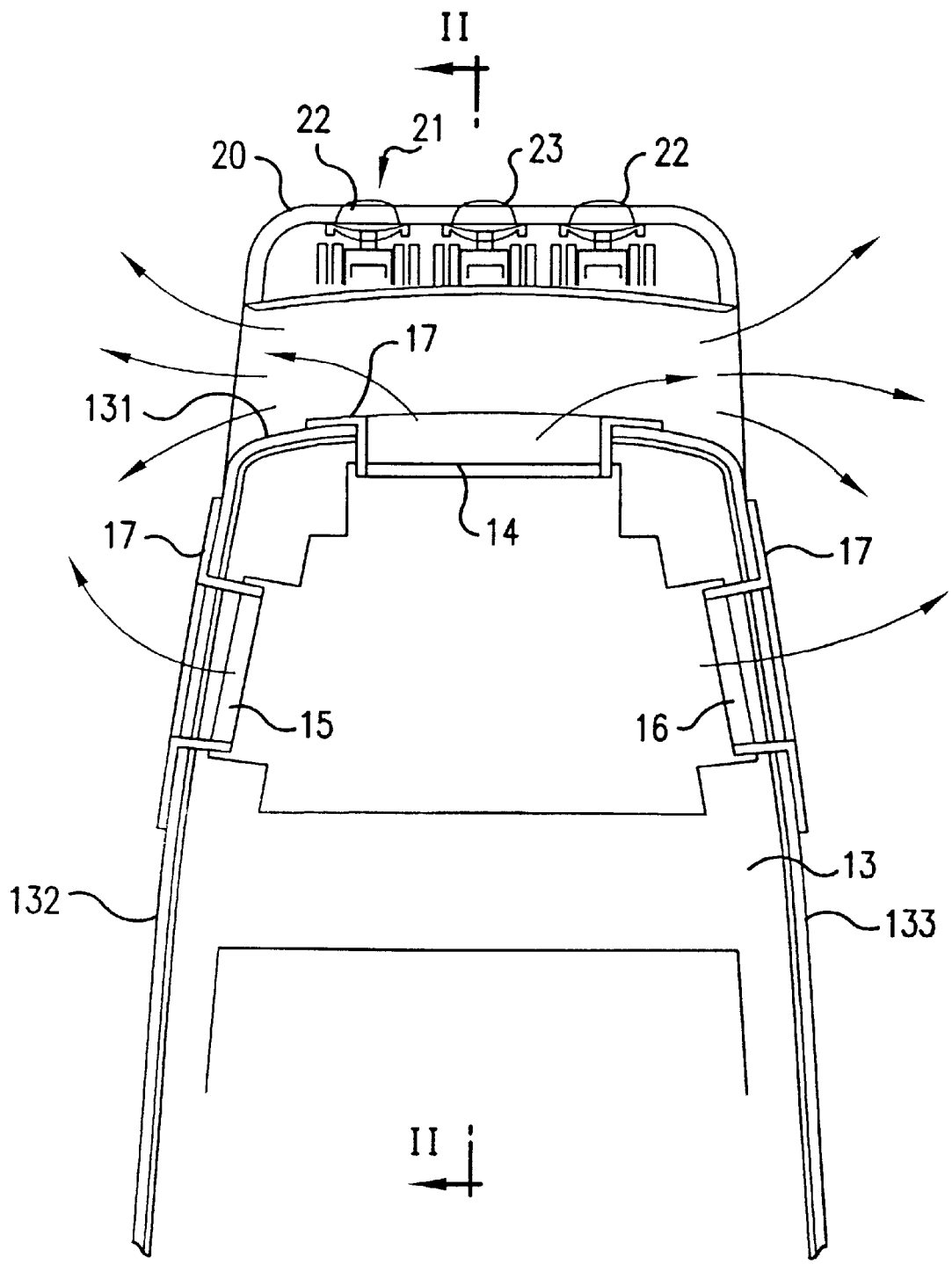
FIG. 3 is a sectional view along line III—III in FIG. 2.
Figure 4:
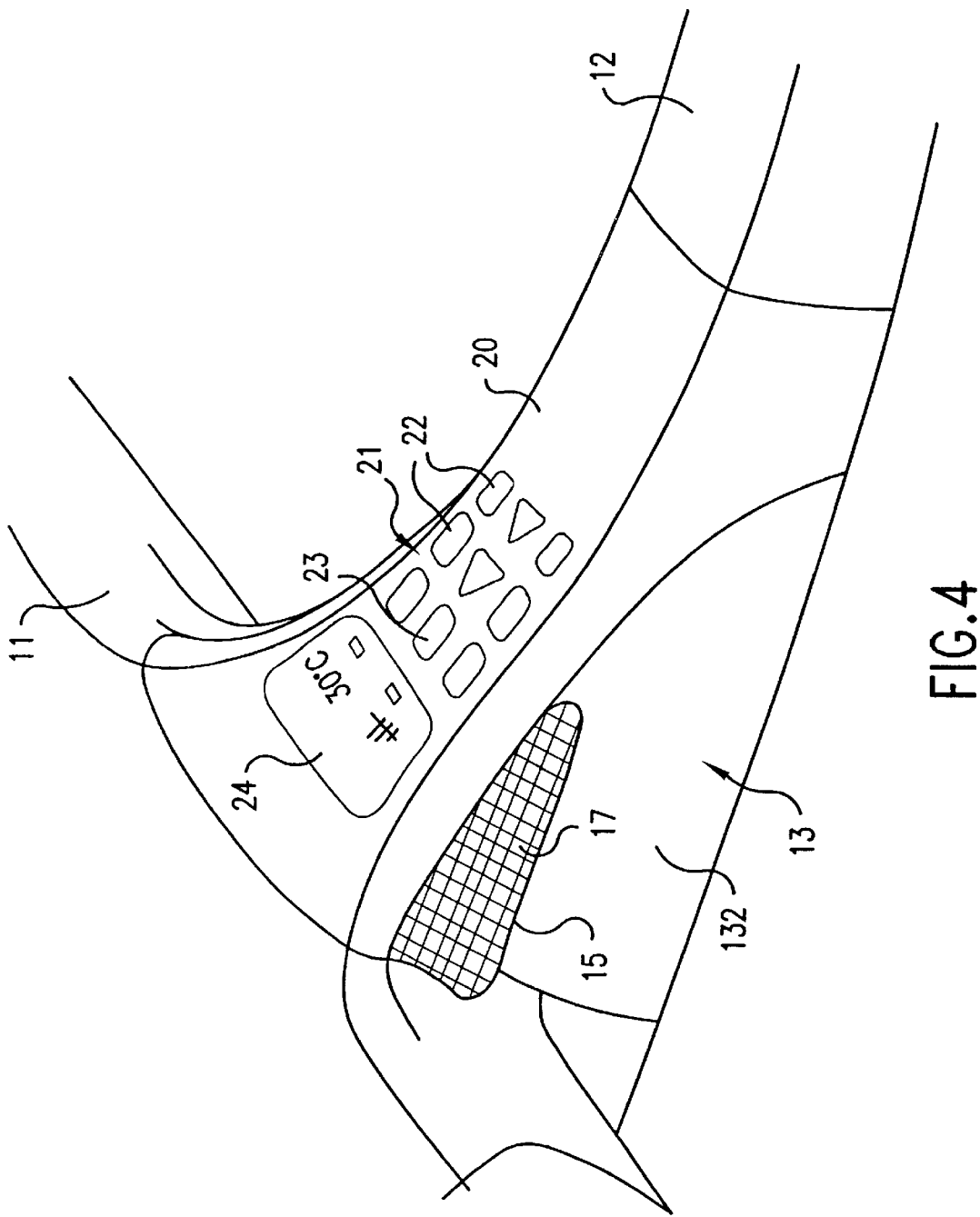
FIG. 4 is a perspective view very similar to that of FIG. 1 but of a modified covering part.
Figure 5:
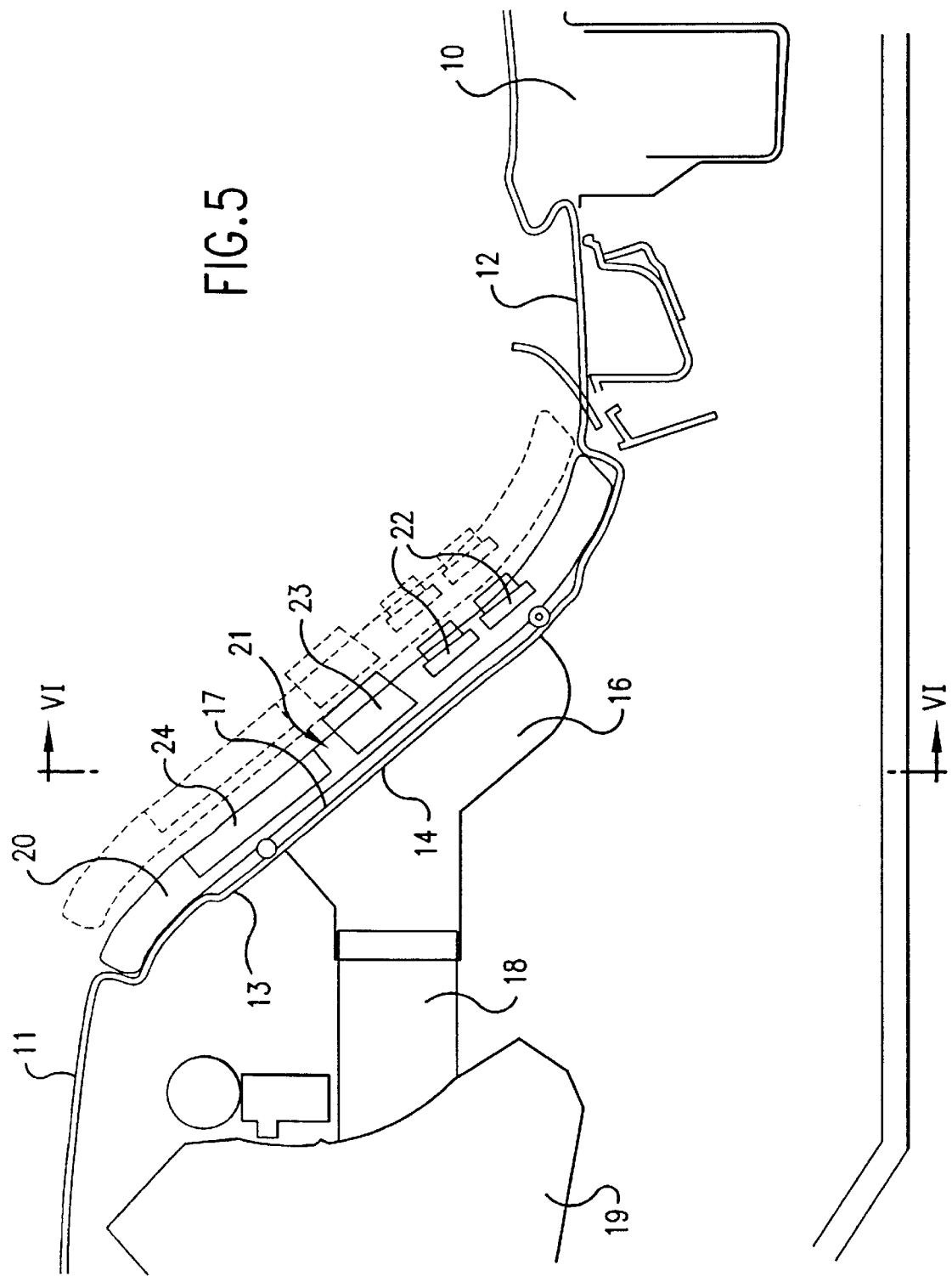
FIG. 5 is a longitudinal sectional view of the covering part in FIG. 4 along line V—V in FIG. 6.
Figure 6:
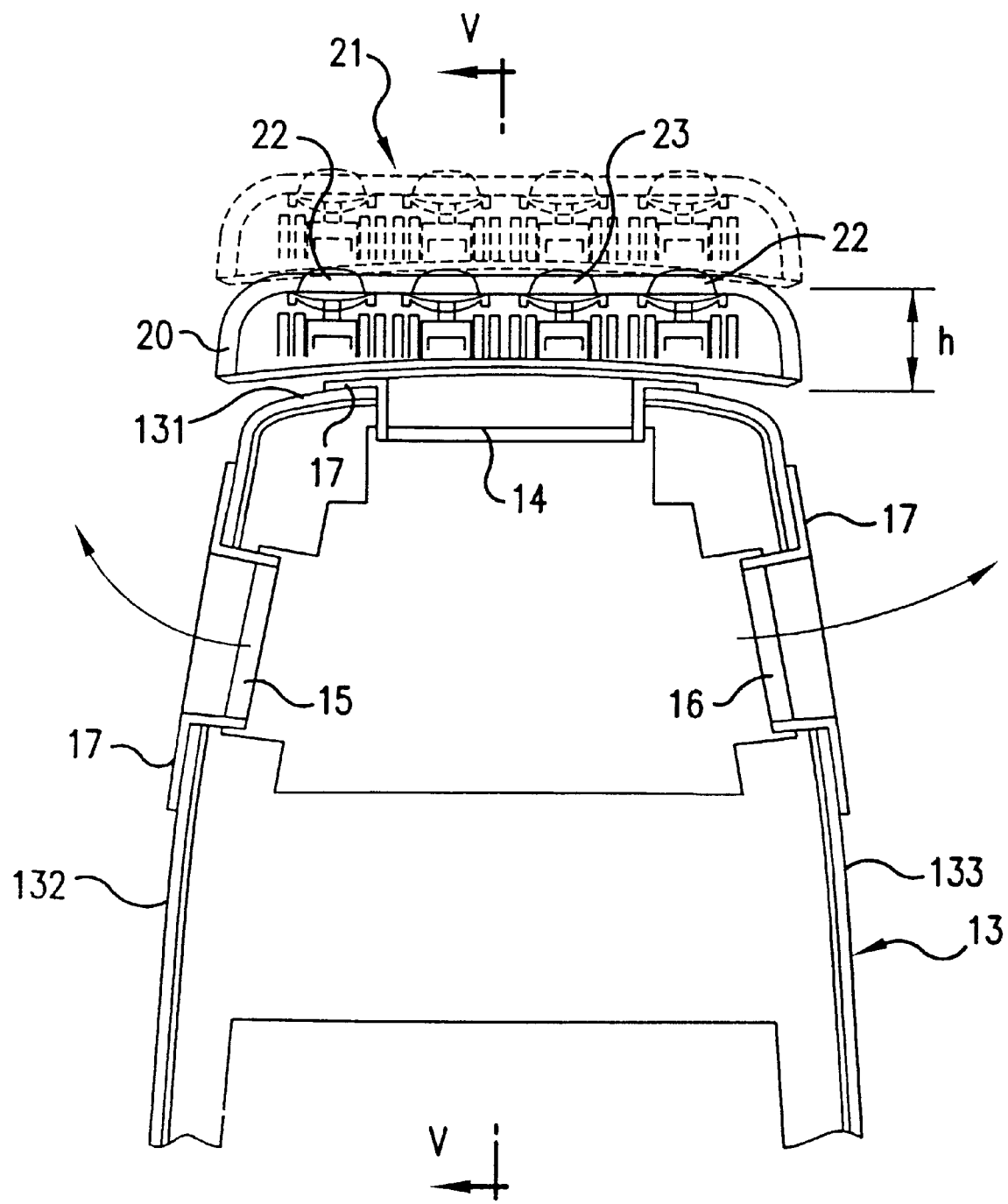
FIG. 6 is a sectional view along line VI—VI in FIG. 5.

The covering part, which is illustrated perspectively in FIG. 4 and in various sectional views in FIGS. 5 and 6, is modified to such an extent that the bridge console 20 is not fixedly connected with the instrument panel 11 and the center console 12 but is constructed to be displaceable in the direction of its normal line with respect to its surface accommodating the operating unit 21 such that it can be placed on the front surface 131 of the center part 12. Otherwise, the covering part according to FIGS. 4 to 6 corresponds to the covering part according to FIGS. 1 to 3, so that identical components have the same reference numbers.

As indicated particularly clearly in FIG. 5, the bridge console 20 placed onto the center part 13 of the instrument panel 11 closes off flush with the upper edge of the instrument panel 11 and the surface of the center console 12. In the area of the air outlet opening 14 in the front surface 131 of the center part 13, the backside of the bridge console 20 is coordinated with the front surface 131 such that it is capable of closing off the air outlet opening 14 in the front surface 131. The air fed to the air outlet openings 14, 15, 16 by way of the air duct 18 can now flow out only by way of the air outlet openings 15, 16 in the lateral surfaces 132, 133 of the center part 13 if the shut-off flaps are opened which are assigned to these air outlet openings 15 and 16.

As illustrated by dash lines in FIGS. 5 and 6, in the direction of its normal line, the bridge console 20 can be lifted by a maximal amount h off the front surface 131 of the center part 13 and can be fixed in a force-locking or form-locking manner in any intermediate position in the lift-off path. As a result, a gap is formed between the front surface 131 of the center part 13 and the backside of the bridge console 20. By way of this gap, the air flowing out of the air outlet opening 14 in the front surface 131 of the center part 13 can now flow out laterally. When the air outlet openings 15, 16 in the lateral surfaces 132, 133 of the center part 13 are closed, a diffuse ventilation can therefore be generated in the front space. Because of the displaceability of the bridge console 20, the operating unit 21 can be positioned ergonomically optimally with respect to the respective user of the vehicle.

In comparison to the covering part described with respect to FIGS. 5 and 6, the covering part illustrated in FIG. 7 is modified only to such an extent that the bridge console 20 is not constructed to be displaceable but swivellable. For this purpose, the bridge console 20 is disposed with its lower part on a swivel pin 25 which, in the transition area from the center part 11 to the bridge console 12, is fixed in the center part 11 or is fixed in the center console 12 transversely to the longitudinal axis of the bridge console and the center console 20, 12. The bridge console 20, which can be swivelled only about a limited angle a, can be arranged to be arrested in a force-locking or form-locking manner in any swivelling position. By separate devices. Otherwise, the construction and method of operation of the covering part according to FIG. 7 corresponds to that of FIGS. 5 and 6, so that identical components are provided with the same reference numbers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A covering part for mounting on a front wall of a vehicle occupant compartment, comprising an instrument panel, a center console which extends centrally in a longitudinal direction of the vehicle occupant compartment, and a hood-shaped center part extending centrally of a lower area of the instrument panel and changing on an end side thereof into the center console, wherein a bridge console, which is sized to span the center part at a distance from a front surface thereof, extends from an upper area of the instrument panel to the center console, and air outlet openings are operatively arranged in the center part.

2. The covering part according to claim 1, wherein one end, the bridge console flushly adjoins an upper edge of the instrument panel and another end the bridge console rests against contours of the center console.

3. The covering part according to claim 1, wherein the bridge console is configured to be separable from the instrument panel and the center console.

4. The covering part according to claim 3, wherein one end, the bridge console flushly adjoins an upper edge of the instrument panel and another end the bridge console rests against contours of the center console.

5. The covering part according to claim 1, wherein a top side of the bridge console is slightly curved and is rounded on lateral edges thereof.

6. The covering part according to claim 1, wherein one of the air outlet openings is arranged in a front surface of the center part and the other air outlet openings are arranged in lateral surfaces of the center part.

7. The covering part according to claim 6, wherein the air outlet openings in the lateral surfaces are configured to have a shut-off flap associated therewith.

8. The covering part according to claim 1, wherein the bridge console is configured to be displaceable in a direction of a normal line thereof with respect to the surface so as to be placeable on a front surface of the center part and retained in a desired displacement position.

9. The covering part according to claim 1, wherein the bridge console is configured to be swivelled by a defined swivelling angle about a swivel pin arranged proximate the center console and aligned transversely to a dimensional direction of the bridge console so as to be retainable in a desired swivelling position.

10. The covering part according to claim 8, wherein one of the air outlet openings in a front surface of the center part and a backside of the bridge console in the area of the one air outlet opening are coordinated with one another such that the one air outlet opening is closed when the bridge console is placed on the front surface of the center part.

11. The covering part according to claim 9, wherein one of the air outlet openings in a front surface of the center part and a backside of the bridge console in the area of the one air outlet opening are coordinated with one another such that the one air outlet opening is closed when the bridge console is placed on the front surface of the center part.

12. The covering part according to claim 1, wherein an operating unit with operating elements and/or control and display elements is operatively arranged on a top side of the bridge console.

13. The covering part according to claim 12, wherein all electric connections leading to the operating elements and/or control and display elements are combinable so as to comprise a central plug.

14. The covering part according to claim 12, wherein the operating elements are configured as foil switches.

15. The covering part according to claim 13, wherein the operating elements are configured as foil switches.

* * * * *